United States Patent [19]

Blatt

[11] 4,021,027

[45] May 3, 1977

[54] POWER WEDGE CLAMP WITH GUIDED ARM

[76] Inventor: Leland F. Blatt, 31915 Grooseeck Highway, Frasier, Grosse Pointe Shores, Mich. 48026

[22] Filed: May 17, 1976

[21] Appl. No.: 687,105

[52] U.S. Cl. .................................................. 269/32

[51] Int. Cl.² ........................ B23Q 3/08; B25B 1/14

[58] Field of Search .................. 269/91, 93, 94, 27, 269/31, 32, 35, 135, 228, 285, 321 ME; 81/395

[56] References Cited

UNITED STATES PATENTS

| | | | |
|---|---|---|---|
| 2,600,584 | 6/1952 | Snell | 269/228 |
| 3,482,831 | 12/1969 | Blatt | 269/32 |
| 3,702,185 | 11/1972 | Blatt | 269/35 |

*Primary Examiner*—Al Lawrence Smith
*Assistant Examiner*—Robert C. Watson
*Attorney, Agent, or Firm*—Cullen, Settle, Sloman & Cantor

[57] ABSTRACT

In a fluid power operated clamp which includes a cylinder, piston and piston rod and connected thereto a bifurcated housing mountable upon a support. The housing includes a pair of spaced body plates with their outturned ends secured to said cylinder. A pivot bolt extends between forward portions of said body plates, and pivotally mounted thereon is a clamp arm, in one position of adjustment adapted to retainingly engage a workpiece relative to said support. A pair of links at their one ends bear against opposite sides of the clamp arm and are pivotally connected thereto. The improvement for the foregoing clamp which comprises a rod end coaxial of the piston rod interposed between and guidably bearing against the body plates and axially connected to the piston rod. Forward portions of the rod end are machined to provide an extension of reduced width. The other ends of the links bear against opposite sides of the extension. A pressure pivot pin extends through said links and rod end extension. An opposed pair of elongated internal slots are formed along the length of said body plates. The free ends of the pressure pivot pin are flattened at their tops and bottoms for sliding non-rotative movement within and along said internal slots. A further improvement includes machining of the clamp arm to provide a section of reduced width. The said one ends of said links bearing against said section of reduced width. A further improvement includes spaced tubular spacers interposed between and engaging rearward portions of the body plates with fasteners extending therethrough and a further spacer interposed between and bearing against interior portions of said body plates, extending through the said one ends of said links and through said clamp arm.

1 Claim, 3 Drawing Figures

FIG. 2
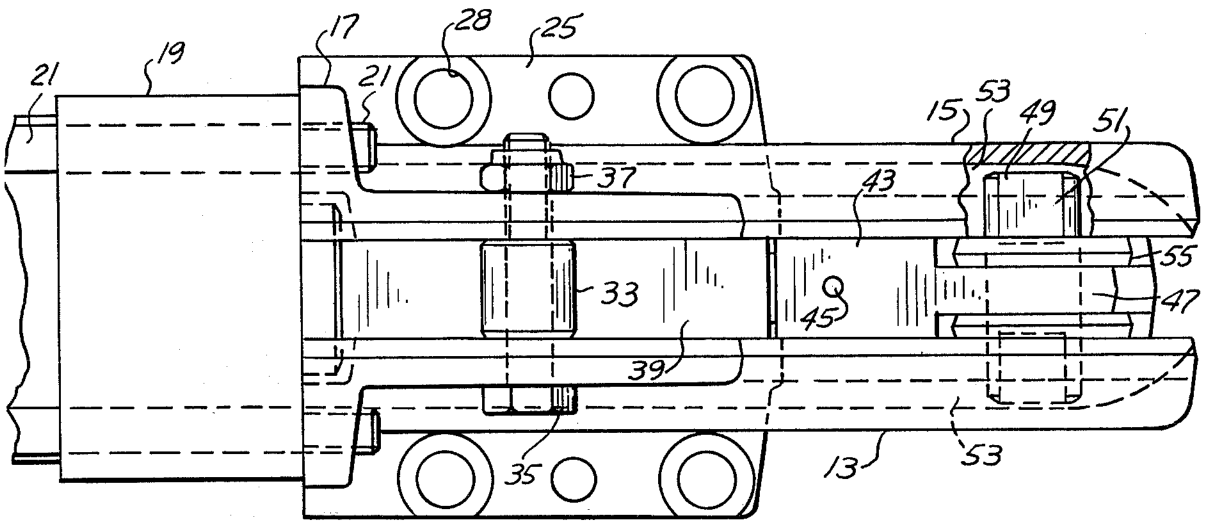
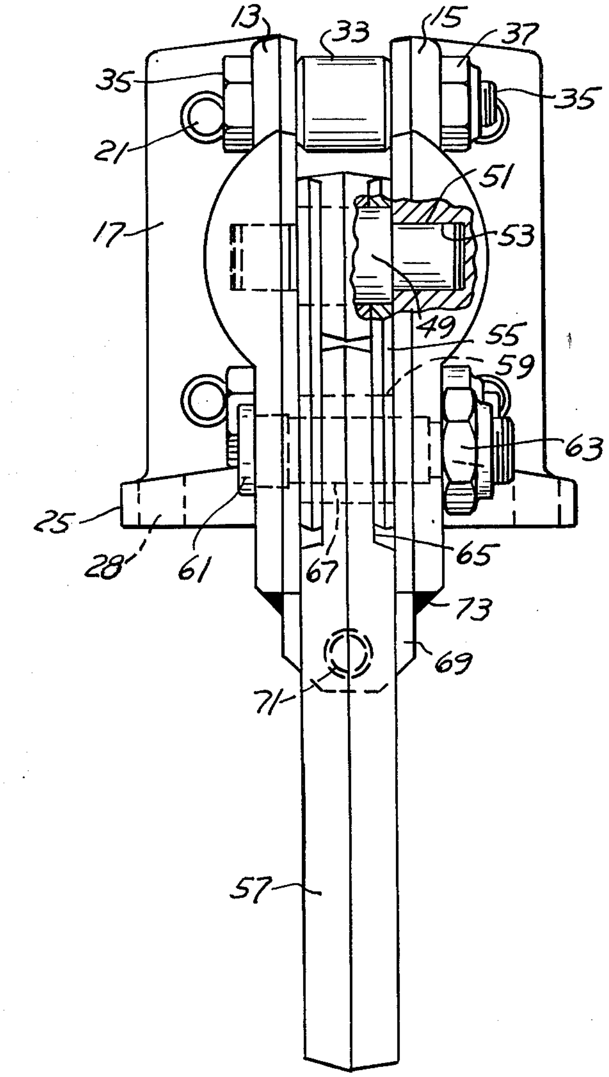
FIG. 3

POWER WEDGE CLAMP WITH GUIDED ARM

BACKGROUND OF THE INVENTION

The basic arrangement for a fluid power operated clamp is shown in the Applicant's U.S. Pat. No. 3,702,185 issued Nov. 7, 1972. The present invention represents an improvement in the construction shown in said patent which renders the tool more effective in operation and less costly in manufacture and provides guide mechanism for movements of the clamp arm between release and workpiece securing positions.

SUMMARY OF THE INVENTION

It is an object of the present invention to provide an improved power wedge clamp with guided arm with an improved connection between the upper ends of a pair of control links and a rod end interposed therebetween and connected with the piston rod. It is a further object to provide a pressure pin pivot connection between said rod end and said links with the flattened ends of the pivot pin slidably and guidably and nonrotatively mounted within and along opposed internal longitudinal slots upon the interior of the housing.

A further object includes the provision of a housing which includes a pair of opposed symmetrical right-hand and left-hand body plates which are suitably bolted together with a pair of tubular spaces towards the rearward ends of the body plates as well as a further spacer between forward portions of said plates which receive the pivot bolt which mounts the clamp arm.

It is a further object to provide a prestop block which spans the body plates and mounts an adjustable set screw in the path of rearward movement of the clamp arm to provide sufficient pressure on the clamp arm when in its closed workpiece securing position to remove all slop from the clamp.

These and other objects will be seen from the following specification and claims in conjunction with the appended drawings.

THE DRAWINGS

FIG. 2 is a plan view thereof partly broken away and sectioned.

FIG. 3 is a front end view thereof partly broken away and sectioned.

Figure 1:
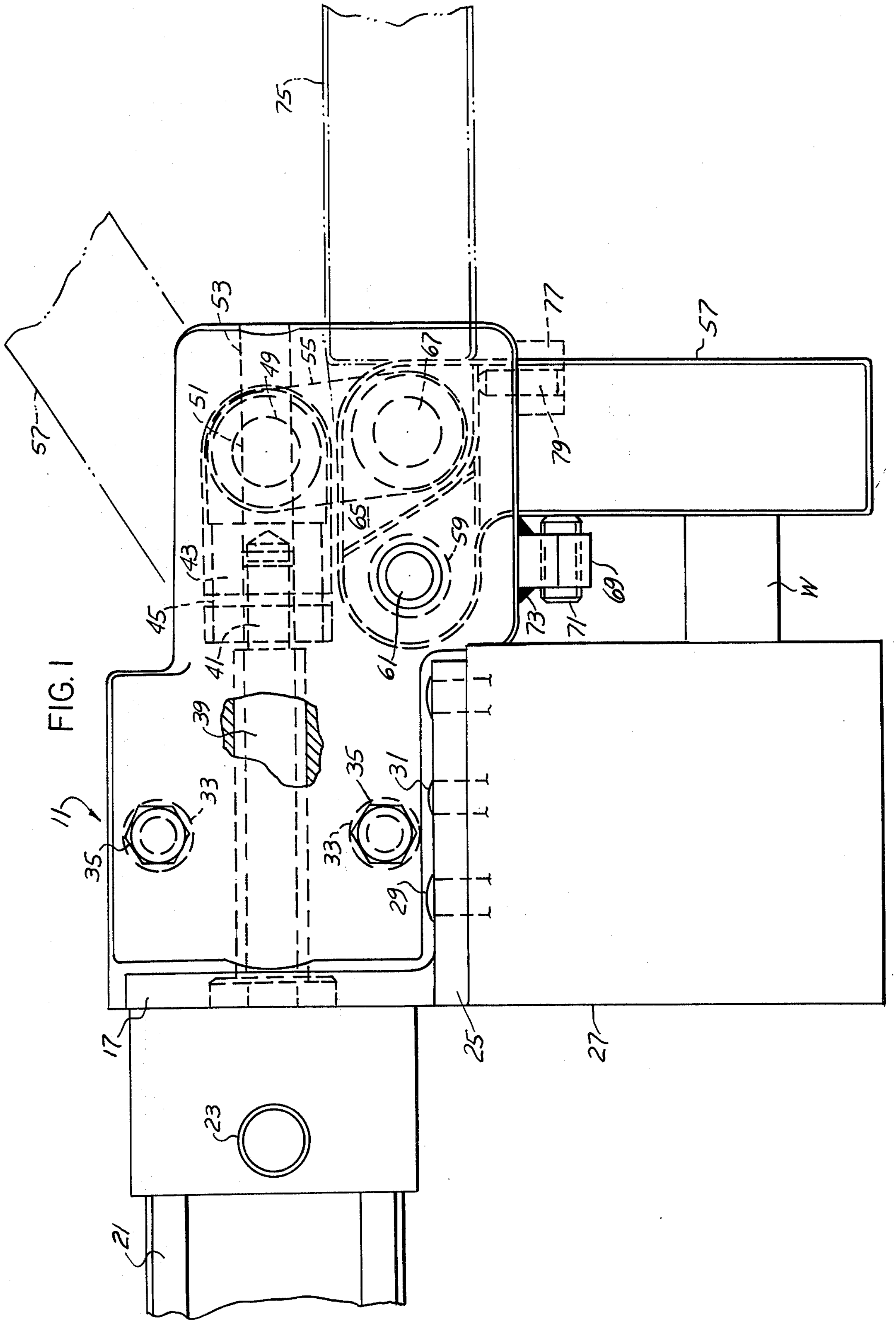
FIG. 1 is a fragmentary side elevational view of the present power wedge clamp with guided arm as mounted upon a support with the clamp arm shown in workpiece securing position.

It will be understood that the above drawings illustrate merely a preferred embodiment of the invention, and that other embodiments are contemplated within the scope of the claims hereafter set forth.

DETAILED DESCRIPTION OF THE INVENTION

Referring to the drawings, the present invention and the illustrative embodiment herein represents an improvement over what is shown in my earlier issued U.S. Pat. No. 3,702,185 of Nov. 7, 1972. The present power wedge clamp, generally indicated at 11, FIG. 1, includes a pair of opposed symmetrical oppositely arranged left-hand and right-hand body plates 13 and 15 whose right angular outturned ends 17 bear against and are secured to the air or hydraulic cylinder 19, fragmentarily shown in FIGS. 1 and 2. Since the construction of the cylinder is conventional portions have been omitted. The cylinder, however, includes a plurality of cylinder bolts 21 which extend between the cylinder heads and threadedly extend through the body plate outturned ends 17. This provides the means of axially aligning and securing the present housing including body plate 13 and 15 with respect to cylinder 19. Said body plates also have outturned base flanges 25 which bear against and are supported upon support 27. Fasteners 29 and dowls 31 extend through apertures 28 in said base flanges and down into support 27 for anchoring the cylinder and clamp assembly to and upon support 27.

A pair of apertured plate spacers 33 are interposed between rearward portions of the body plates 13 and 15, and corresponding cap screws 35 extend through said body plates and spacers respectively and are suitably anchored as by the lock nuts 37, FIGS. 2 and 3.

The cylinder which is conventional includes the usual piston and the axially extending piston rod 39 which projects outwardly of the cylinder 19 and into the body defined by plates 13 and 15 for reciprocal movements. Said reciprocal movements are provided in a conventional manner by applying pressure fluid alternately to opposite ends of the cylinder such as by ports 23, one of which is shown at the forward end of said cylinder, FIG. 1.

Said piston rod has an extension 41 which extends axially into rod end 43 threadedly engaging said rod end and further anchored with respect to said rod end by the transverse drive pin 45.

Rod end 43 is guidably disposed between the interior walls of said housing and body plates with the forward end portions of said rod end oppositely machined to define the extension 47 of reduced width, FIG. 2.

The transverse pivot pin 49 has its opposite ends flattened above and below at 51 for guided positioning within and along the opposed pair of milled internal slots 53 formed in the interior walls of the body plates 13 and 15.

The purpose of providing internal slots for the guided mounting of the pressure pivot pin 49 as distinguished from corresponding through slots shown in U.S. Pat. No. 3,702,185, is to prevent foreign debris from entering the mechanism. A pair of opposed links 55 are arranged upon opposite sides of the pressure pivot pin 49 and bear against rod end extension 47 and at their upper ends receive the transverse pressure pivot pin.

Clamp arm 57 is interposed between forward portions of the body plates and is pivotally mounted upon the tubular spacer 59. Pivot bolt 61 extends through the body plates through the spacer and arm and is anchored with respect to the body plates by a suitable fastener or lock nut 63, FIG. 3.

Intermediate portions of the clamp arm are machined on its opposite sides defining the cut away portion 65 against which bear the other ends of the links 55 and which are pivotally connected to said arm by the transverse pivot pin 67. The pivot pin is retained with respect to the links and arm 57 with the inner ends of said pivot pin bearing against interior surface portions of the body plates.

A prestop block 69 extends and is interposed between forward portions of the body plates and suitably secured thereto as by the welds 73. Set screw 71 is adjustably threaded through the prestop 69, and in the securing position of the clamp arm 57 with respect to workpiece W operatively engages a portion of said clamp arm with sufficient pressure on said clamped arm in said closed position to remove all slop from the mechanism. Such slop normally exists due to manufacturing tolerences.

In FIG. 1, complete release position of the clamp arm 57 is shown in dash lines.

MODIFICATION

A modified straight type of clamp arm is shown in dash lines at 75 as interposed between forward portions of the body plates 13 and 15 and pivotally mounted thereon upon the spacer 59 and corresponding pivot bolt 61 as described above with respect to clamp arm 57. In FIG. 1, the modified clamp arm 75 as fragmentarily shown is in a workpiece securing position bearing against the adjustable set screw 79 of the secondary prestop 77 which spans the body plates 13 and 15 and is suitably secured thereto in the same manner as above described with respect to prestop 69. The alternative prestop 77 would be employed if a clamp arm were used such as shown at 75 for the purposes above described.

Having described my invention, reference should now be had to the following claims.

1. In a fluid power operated clamp including a cylinder having a reciprocal piston and connected piston rod projecting from said cylinder, a bifurcated housing axially aligned with and connected to said cylinder and mountable upon a support, said housing being open at its top, bottom, and front, and including a pair of opposed spaced body plates with their ends outturned and secured to said cylinder, said piston rod extending into said housing between said body plates, a pivot bolt extending between forward portions of said body plates and secured thereto, a clamp arm at one end pivotally mounted on said pivot bolt, and in one position, adapted to retainingly engage a workpiece relative to said support, a pair of links at their one ends bearing against opposite sides of said clamp arm and pivotally connected thereto;

the improvement comprising:

a rod end coaxial to said piston rod interposed between and guidably bearing against said body plates, and axially connected to said piston rod for reciprocal movements therewith;

forward portions of said rod end being machined providing an extension of reduced width; the other ends of said links bearing against opposite sides of said extension;

a pressure pivot pin extending through said links other ends and rod end extension; there being an opposed pair of elongated internal slots along the length of said body plates;

the free ends of said pressure pivot pin being flattened upon its top and bottom for sliding non-rotative movement within and along said internal slots;

portions of said clamp arm intermediate its ends being machined providing a section of reduced width; the said one ends of said links bearing against said section of reduced width;

a pair of spaced tubular spacers interposed between and engaging rearward portions of said body plates;

fasteners extending through said spacers and body plates and secured thereto;

a spacer interposed between and bearing against forward and interior portions of said body plates, extending through said one ends of said links and through said clamp arm;

the opposed sides of said clamp arm cooperatively and guidably bearing against interior portions of said body plates during movements between workpiece clamping and release positions;

a pre-stop block spanning and secured to portions of said body plates and spaced from said clamp arm;

and an adjustable set screw threaded through said block adapted for pressure engagement with the clamp arm when in workpiece-retaining position; said set screw providing sufficient pressure on the clamp arm in its closed or securing position to remove all slop (due to manufacturing tolerences) from said clamp.

* * * * *